United States Patent [19]

Deussner

[11] 4,212,850
[45] Jul. 15, 1980

[54] METHOD FOR THE CALCINING OF LIME

[75] Inventor: Herbert Deussner, Gladbach, Fed. Rep. of Germany

[73] Assignee: Klöckner-Humboldt-Deutz AG, Fed. Rep. of Germany

[21] Appl. No.: 875,699

[22] Filed: Feb. 6, 1978

[30] Foreign Application Priority Data

Feb. 11, 1977 [DE] Fed. Rep. of Germany ....... 2705710

[51] Int. Cl.² .......................................... C01F 11/06
[52] U.S. Cl. ................................. 423/175; 422/193; 422/194; 422/198; 423/637; 432/14; 432/29; 432/102
[58] Field of Search .................. 423/175, 177, 637; 432/14, 15, 29, 102

[56] References Cited

U.S. PATENT DOCUMENTS

| 2,345,067 | 3/1944 | Osann ................................. 432/29 |
| 3,761,567 | 9/1973 | Parsons ............................. 423/175 |

FOREIGN PATENT DOCUMENTS 1415659 11/1975 United Kingdom ..................... 432/29

Primary Examiner—Wayne A. Langel
Attorney, Agent, or Firm—Hill, Van Santen, Steadman, Chiara & Simpson

[57] ABSTRACT

This invention relates to a countercurrent combustion method and apparatus for the production of calcined lime in a furnace which contains, in sequence, at least one preheating zone, combustion zone, and a cooling zone. The entire combustion air is passed through the cooling zone thereby to preheat the same. A portion of the thus preheated air is withdrawn from the furnace and heated in a recuperation zone which may be within or outside the vertical shaft furnace but is located between the preheating zone and the combustion zone. In the recuperation zone, the air is heated to approximately the deacidification temperature and then is supplied to the combustion zone.

8 Claims, 3 Drawing Figures ved at a temperature which is slightly above deacidification temperature.

METHOD FOR THE CALCINING OF LIME

BACKGROUND OF THE INVENTION

1. Field of the Invention

This invention is in the field of calcining in a vertical shaft furnace, and utilizing a recuperation zone intermediate the other zones of the furnace to carry out the calcining operation more efficiently from the standpoint of heat usage.

2. Description of the Prior Art

It is known from German Laid Open Pat. No. 2,364,626 to preheat the entire combustion air for a shaft furnace for the calcining of lime, dolomite, magnesite, or other carbon containing substances by contacting the same in a cooling zone with the lime which has been calcined to completion. In this arrangement, the portion of the air which remains in the shaft furnace flows through the bottom upwardly in countercurrent contact with the treatment material. In the known method, however, there is a disadvantage that the combustion air required for the operation of a lime calcining furnace is preheatable only to about 500° C by its utilization as cooling air for the calcined lime. Since the deacidification temperature of the lime material ranges usually between 800° and 900° C., additional energy must be supplied either by use of an increased amount of fuel during calcination, or by means of a further preheating of the combustion air.

There has been proposed a regenerative preheating of the combustion air, as for example in the periodical "Zement-Kalk-Gips" No. 5, 1970, pages 206 to 209. With this arrangement, however, there is the disadvantage that the entire amount of combustion air is not used for the cooling of the calcined lime, since part of the combustion air which is preheated by means of the exhaust gas heat is drawn up as fresh air. The result is a rather inefficient overall process.

SUMMARY OF THE INVENTION

The present invention seeks to improve the previously known countercurrent methods for vertical shaft furnaces and to make possible an optimal utilization of the energy supplied to the total system, as well as to afford a simple type of construction which operates reliably.

The existing problem is solved in accordance with the present invention in that part of the combustion air withdrawn from the furnace shaft is conveyed to a recuperator to which at least a part of the exhaust gases of the combustion zone flow. With this type of arrangement, the portion of the exhaust gas is made available with a high degree of effectiveness for the calicination process.

BRIEF DESCRIPTION OF THE DRAWINGS

In the drawings:

FIG. 3 is a diagrammatic view showing the shape of the recuperator elements in the inwardly disposed recuperator.

DESCRIPTION OF THE PREFERRED EMBODIMENTS

Figure 1:
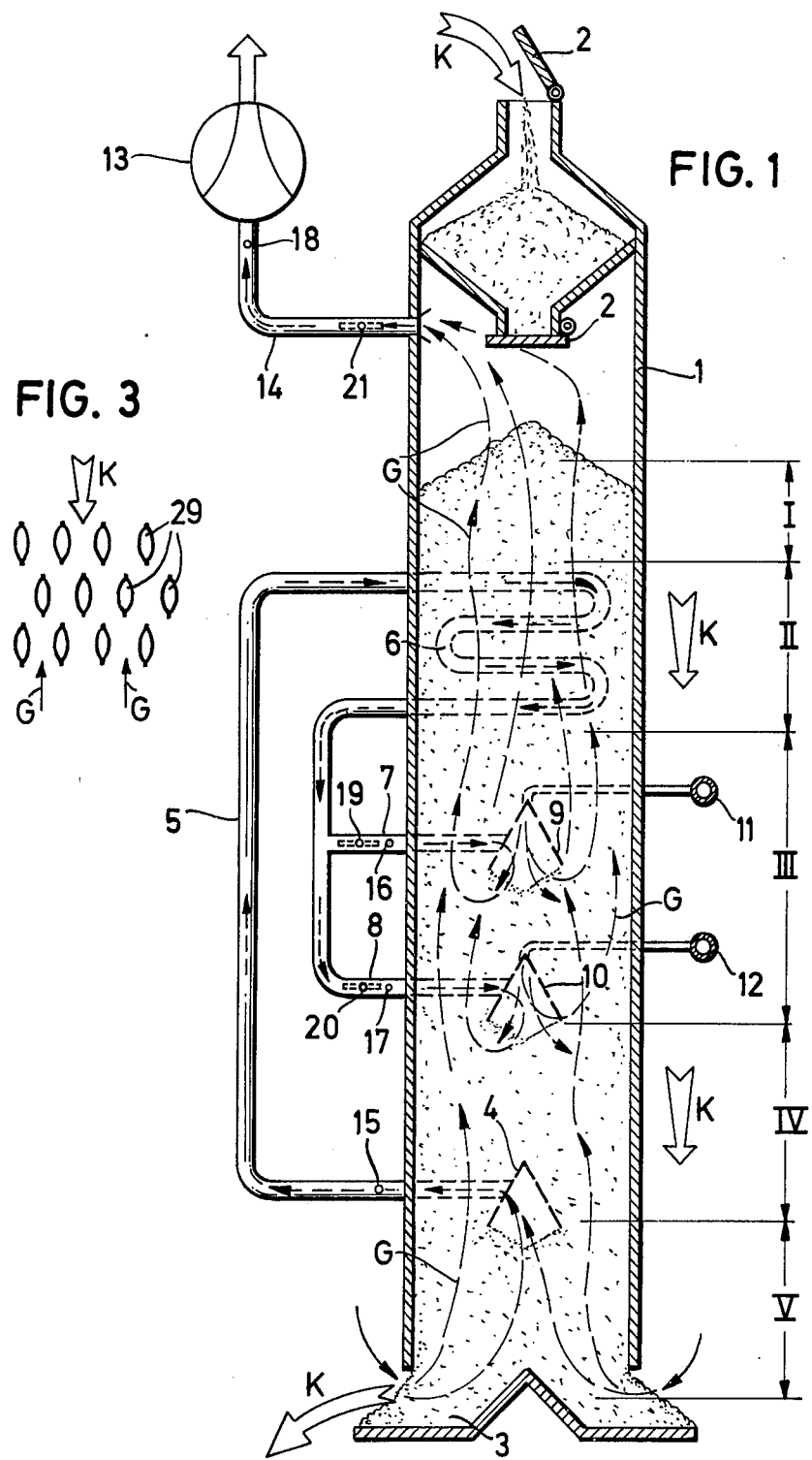
FIG. 1 shows a diagrammatic view of a vertical shaft furnace with a recuperator located within the confines of the furnace.

In accordance with the present invention, the air withdrawn in the recuperator is heated to approximately the deacidification temperature, and is supplied as combustion air to the combustion zone. With this improvement, the highest utilization of the heat contained in the exhaust gas is attained.

In a preferred embodiment of the invention, the gases leaving the recuperator flow through at least a part of the preheating zone. By this means, a complete utilization of the heat contained in the exhaust gas is achieved.

In a specific embodiment of the present invention, the part of the combustion air withdrawn from the vertical shaft furnace amounts to about 35 to 65% of the preheated air introduced into the cooling zone. This range of diverted air provides the quantity of air most suitable for the optimal utilization of the heat.

In a further embodiment of the invention, the air remaining in the furnace subsequently to the cooling zone flows through a pre-cooling zone where it is highly heated and then is passed into the combustion zone to serve as an additional source of calcination air. Through the division of the furnace into the zones as hereinafter explained, it is possible to heat the combustion air remaining in the furnace shaft to the deacidification temperature. In this manner, the calcination takes place in the combustion zone solely with air which has been preheated to deacidification temperature. Also, the first raw material which reaches the combustion zone is preheated almost to the deacidification temperature. In the calcination method according to the present invention, only sufficient heat energy is used to actually cause deacidification. The amount of fuel employed therefore can be reduced to a minimum.

In a further preferred embodiment of the invention, the combustion air heated in the recuperator almost to deacidification temperature is supplied to as many as three superimposed planes in the combustion zone. Accordingly, the calcination operation in the combustion zone is distributed over a large surface so that a smoother combustion behavior is achieved and other possible disadvantages are prevented.

Another feature of the present invention resides in the fact that the gas flowing through the furnace shaft and through the recuperator is moved by means of a single exhaust gas blower. With this arrangement, there is obtained a particularly simple embodiment which further has the advantage that the blower is disposed on the furnace head, where because of the transfer conditions in the furnace, the lowest gas temperature is present.

In another preferred embodiment of the invention, the flow resistance of the gases through the recuperator is adjusted so that it is lower than the flow resistance of the gases through the subsequent deacidification and pre-cooling zone respectively. By this means, the gases heated in the cooling zone flow mainly into the conduit to the recuperator. They then flow through the recuperator and reach the inlet points into the combustion zone without the inclusion of an additional blower being necessary.

In the division of the air flowing through the recuperator and the subsequent deacidification or pre-cooling zone, there are provided regulating members in the air path of the recuperator. The adjustment of the quantity of air flowing through the recuperator is possible through the use of throttling or retarding members, which assure that the differential pressure between the combustion zone and the removal point of the preheated air is sufficiently high for the flow of air remaining in the furnace. In this manner, a particularly simple adjustment of the air which is conveyed off and the air rising through the furnace is possible.

In the method of the present invention, there is provided a countercurrent shaft furnace which includes, from top to bottom, at least one preheating zone, a combustion zone having supply devices for combustion air therein and a cooling zone with a removal apparatus for preheated air in the cooling zone. A recuperator is provided for further heating of a part of the preheated air, the recuperator being connected on its inlet side with the air removal apparatus of the cooling zone and on its outlet side with the feed of combustion air to the combustion zone. With this arrangement, there is provided an apparatus in which an optimal utilization of the quantity of heat contained in the exhaust gases is possible.

In one embodiment, the recuperator is arranged above the combustion zone in the interior of the vertical furnace shaft. With this arrangement in the furnace shaft, a particularly high degree of recuperator effect may be attained. It is particularly advantageous where the first raw material slides downwardly along the heated heat exchanger surface, whereby a deposit of condensable constituents of exhaust gas on these heat exchanger surfaces is prevented.

In another embodiment of the invention, the recuperator may be located outside of the interior of the shaft and be provided with an exhaust gas inlet from the furnace interior as well as a return conduit for exhaust gas in the interior of the furnace. This embodiment is particularly applicable where constant supervision and maintenance of the recuperator is necessary as, for example, when treating valuable materials.

The combustion zone has inlets for combustion air and combustion devices in several planes, preferably two or three. The lowest plane of the combustion air inlet and the combustion devices is spaced above the plane of the removal apparatus for the air. In this way there results an advantageous distribution of the energy introduced into the furnace to a large furnace volume so that an overheating is prevented. The spacing of the removal apparatus for the air from the cooling zone and from the combustion zone insures that a zone is available which serves not only as a pre-cooling zone for the calcined material but also exerts a locking function important for the flow through the recuperator.

The return flow device for the exhaust gas coming out of the exterior recuperator is spaced above the removal apparatus for the exhaust gas in the shaft. With this recuperator arrangement, at low flow resistance of the exhaust gas through the recuperator, the exhaust gas blower brings about the recuperator flow through with heating or hot gas. Regulation then can be achieved merely by using a throttle or retarding member.

The recuperator is preferably formed of a serpentine arrangement of pipes and/or surface elements which have elliptical cross sections, with the major axis being arranged in the direction of the material or gas flow. This provides a relatively simple recuperator which may be arranged within the stream of the first raw material and offers no great resistance to the flow, so that the movement of the raw material is not hindered. Consequently, the movement of the raw material provides no significant wear impairing the life of the recuperator.

As previously mentioned, the shaft furnace has a single blower which operates to bring about the feed of all of the air and the exhaust gas currents in the furnace. This is a particularly simple embodiment which permits both a good adjustability of the gas flows in the furnace and is particularly economical. A further advantage lies in the fact that the vacuum prevails in the entire furnace, so that an escape of dust or exhaust gases is impossible. The operation of the furnace is accordingly entirely emission-free.

One of the features of the present invention is the fact that the connecting conduits between the vertical shaft and the recuperator as well as the conduit from the shaft to the blower contain condition sensing and regulating members. It is thereby possible to measure both the condition of the individual streams of gas, and more particularly, to influence the same directly and not only indirectly through the blower.

The shaft furnace head is provided with a gas tight charging unit, and the foot of the shaft furnace below the cooling zone is provided with a material discharging apparatus. With this arrangement, the shaft furnace achieves an optimal functioning whereby the gas tight charging unit insures the attainment of a vacuum in the furnace interior, and the discharge apparatus through the controlled withdrawal of the calcined lime out of the furnace provides a regulated passage of the lime through the furnace.

The cross section of the shaft furnace is preferably annular. This is particularly advantageous for large quantity outputs, where the volume of the furnace shaft must be very large. By means of the annular shape, the spacing of the walls can be selected so that a uniform gas movement and material movement attained.

In larger furnaces, the introduction of air and fuel into the furnace interior may be carried out with the aid of cooled girders which carry the devices for the introduction of air and fuel.

Turning now to a specific description of the drawings, the path of the limestone and calcined lime is characterized in the drawings by the arrow labeled "K", while the paths of gases are defined by means of the movement arrows "G".

In FIG. 1, reference numeral 1 designates the shaft of the vertical shaft furnace, which includes a charging unit provided with an inlet valve 2 and has at its lower end, the calcined lime discharge 3. In the direction of material movement from top to bottom, there are consecutively a preheating zone I, a recuperation zone II, a deacidification or combustion zone III, a pre-cooling zone IV, as well as the final cooling zone V. These individual zones are separated from each other according to the calcining method and the heat conditions. Between the preheating zone I and the recuperation zone II a conduit 5 injects combustion air into a serpentine type recuperator 6 where it is heated approximately to the deacidification temperature. The recuperator 6 extends with its heat exchange elements through the recuperator zone II. Between the recuperator zone II and the deacidification zone or combustion zone III, the highly heated air from the recuperator 6 passes into conduits 7 and 8 to air supply members 9 and 10 associated with the combustion zone III. Connected to these air supply members 9 and 10 are calcining devices 11 and 12 which serve for the introduction of the fuel.

With larger furnace dimentions, the burner devices are arranged on cooled burner beams, so that the furnace cross section is uniformly supplied with fuel and overheating is prevented. The cooling of the burner beams takes place preferably through a closed cooling circuit, with preheating of the fuel.

The cooling zone extends from the lowermost air supply member 10 to the calcined lime discharge 3. It is divided by means of a cooling air removal device 4 into an upper pre-cooling zone IV and a subsequent cooling zone V which lies therebelow. An exhaust gas conduit 14 extends above the preheating zone I and is connected to an exhaust gas blower 13. In the conduits 5, 7, 8 and 14 there are provided sensing and regulating or damping members 15, 16, 17, 18 or 19, 20, or 21 respectively.

Figure 2:
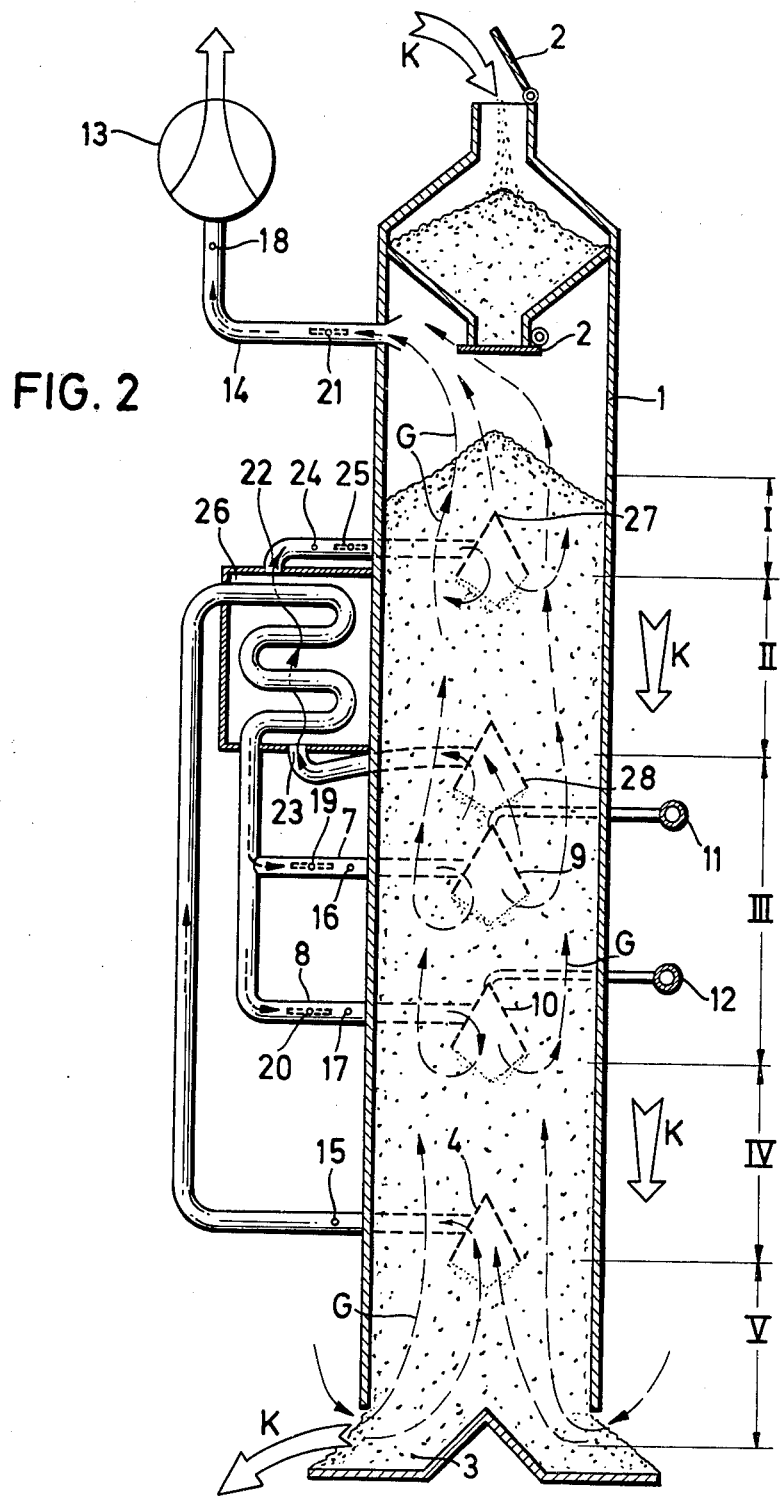
FIG. 2 is a rather diagrammatic showing of a shaft furnace with a recuperator positioned outside the furnace.

The embodiment illustrated in FIG. 2 utilizes a recuperator 26 which is exterior to the furnace. It is also heated by means of exhaust gases from the combustion zone III. The latter are taken through a removal apparatus 28 and a conduit 23 out of the shaft 1. After the heat exchange occurs in the recuperator 26, the gases arrive through a conduit 22 and are delivered into the preheating zone I located in the furnace shaft 1.

FIG. 3 illustrates a preferred embodiment of the recuperator elements for the inwardly disposed recuperator of FIG. 1. Such a recuperator may consist simply of elliptical pipes which are either extruded or welded together from two parts. Between the individual elements 29 there exists a free cross section sufficiently large so that an unhindered passage of gas and material is possible. The elements 29 of the series of pipes are preferably arranged offset with respect to one another.

The raw material K is supplied through the furnace charging device to the valves 2. The raw material passes uniformly and constantly down through the furnace shaft. In the preheating zone I, the first raw material is brought up to a temperature close to the deacidification temperature. Any surface moisture present is evaporated in this zone. On further passage through the recuperation zone II, the physical condition of the raw material is altered only slightly. In the combustion zone III, highly heated combustion air passes into the pre-cooling zone IV, as well as into the recuperator 6. By driving out the carbon dioxide, the limestone is thereby converted into calcined lime which is further slightly deacidified and pre-cooled with a part of the entire cooling air and subsequently is cooled in the after cooling zone V through which the entire cooling air passes. The calcined lime K is finally withdrawn uniformly at the foot of the furnace shaft at the discharge region 3.

The cooling air G enters at the foot of the furnace shaft at the discharge opening 3 and flows upwardly through the after cooling zone V. In that zone, the calcined lime is cooled to its final temperature. The part of the air thus heated is taken through the removal device 4 into the conduit 5 and is circulated through recuperator 6. By means of the hot exhaust gases issuing upwardly from the combustion zone III, this part of the air in the recuperator 6 is heated to approximately the deacidifying temperature. The heated air flows through conduits 7 and 8 as well as air supply members 9 and 10 into the combustion zone III.

The portion of the cooling air not conveyed out of the shaft flows in the shaft upwardly through the pre-cooling zone IV and is likewise heated to approximately the deacidification temperature. The highly heated streams of cooling air now serve in the combustion zone III for the combustion of the fuel supplied through fuel supply devices 11 and 12 whereby the required deacidification heat is released. The resultant combustion gases as well as the carbon dioxide driven out of the limestone thereupon flow through the recuperation zone II and finally during further release of heat to the incoming raw material, through the preheating zone I. The combustion gases finally drawn off by the exhaust gas blower 13 out of the furnace shaft.

For proper operation of the apparatus, care should be taken that the resistance coefficient for the flow of the cooling air through the pre-cooling zone IV is appreciably greater than that for the flow of the other part of the cooling air from the removal device 4 through the conduit 5 through the recuperator 6 up to the reintroduction members 9 and 10. When the pressure ratio is properly adjusted, it is then very simple to control the different air currents by means of regulating members 19 and 20 in the manner which is best suited for the progress of the method.

In a similar manner, the flow through resistance of the recuperator whether located inwardly or exteriorly of the furnace may be adjusted. The larger flow through resistance of the recuperator zone takes care of the regulatable flow through of the recuperator by means of the exhaust gases.

The entire gas passage is itself controlled to the optimum value by means of the regulating member 21 or by means of regulation of the exhaust blower 13 itself.

While the FIGS. of the drawings show embodiments employing a shaft furnace which is fired with liquid or gaseous fuels, it is also possible to employ the improvements of the present invention in furnaces firing solid fuels.

It should be evident that various modifications can be made to the described embodiments without departing from the scope of the present invention.

I claim as my invention:

1. A countercurrent combustion method for the production of calcined lime in a furnace containing, in sequence, a preheating zone, a combustion zone, and a cooling zone which comprises:
    passing the entire combustion air through the cooling zone to thereby preheat said combustion air,
    withdrawing a portion of the thus preheated air from the furnace,
    heating the withdrawn air in a recuperation zone located between said preheating zone and said combustion zone by contact with exhaust gases emanating from said combustion zone to approximately the limestone deacidification temperature, and
    supplying the thus heated air to said combustion zone to convert the limestone into calcined lime.

2. A method according to claim 1 in which:
    the portion of the air withdrawn from said furnace and passed to said recuperation zone amounts to 35 to 65% of the quantity of air preheated in said cooling zone.

3. A method according to claim 2 in which:
    the portion of the air not withdrawn from said furnace is passed to a pre-cooling zone where it is heated to a high temperature and is then passed to said combustion zone.

4. A method according to claim 3 which includes the step of:
    adjusting the flow resistance of the gases through the recuperation zone to be lower than through said pre-cooling zone.

5. A method according to claim 4 which includes the step of:
throttling the gases entering said recuperation zone to achieve such adjustment.
6. A method according to claim 1 in which the exhaust gases after passing through said recuperation zone pass at least partially through said preheating zone.
7. A method according to claim 1 in which:
the combustion air heated in said recuperation zone is supplied to said combustion zone at a plurality of vertical levels.
8. A method according to claim 1 in which:
the gas passing through the furnace and the gas flowing through said recuperation zone are moved by means of a single exhaust gas blower.

* * * * *